(12) United States Patent
Ota

(10) Patent No.: US 6,781,511 B2
(45) Date of Patent: Aug. 24, 2004

(54) COLLISION DETECTING APPARATUS FOR VEHICLE

(75) Inventor: Atsuo Ota, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/244,733

(22) Filed: Sep. 17, 2002

(65) Prior Publication Data

US 2003/0069678 A1 Apr. 10, 2003

(30) Foreign Application Priority Data

Sep. 18, 2001 (JP) ........................................ 2001-283694

(51) Int. Cl.[7] .................................................. B60Q 1/00
(52) U.S. Cl. ........................ 340/436; 340/435; 340/903; 340/909; 701/36; 701/47; 701/45; 180/268; 180/282
(58) Field of Search ................................ 340/436, 435, 340/903, 909; 701/36, 47, 45, 46, 301; 280/734, 735, 727.1; 180/282, 268, 271, 272

(56) References Cited

U.S. PATENT DOCUMENTS

| | | | | |
|---|---|---|---|---|
| 5,904,730 A | * | 5/1999 | Yamazaki et al. | ........... 701/301 |
| 5,936,518 A | * | 8/1999 | Fukui et al. | ................. 340/436 |
| 6,061,616 A | * | 5/2000 | Ohno et al. | .................... 701/45 |
| 6,104,973 A | | 8/2000 | Sugiyama et al. | |

FOREIGN PATENT DOCUMENTS

| | | |
|---|---|---|
| DE | 196 16 836 A1 | 11/1997 |
| DE | 199 13 906 A1 | 10/1999 |
| JP | 4-176757 a | 6/1992 |
| JP | 11-278342 A | 10/1999 |
| WO | WO 00 13944 A | 3/2000 |

OTHER PUBLICATIONS

Patent Abstracts of Japan, vol. 016, No. 484, Oct. 7, 1992 & JP 11 278342 A.

* cited by examiner

*Primary Examiner*—Jeffery Hofsass
*Assistant Examiner*—Hung Nguyen
(74) *Attorney, Agent, or Firm*—Birch, Stewart, Kolasch & Birch, LLP

(57) ABSTRACT

To provide a collision detecting apparatus for a vehicle, including an integrating member for cumulatively integrating an output from an acceleration sensor when the output exceeds a specific calculation start level and a collision detecting member for outputting a collision signal when a cumulative integral value calculated by the integrating member exceeds a threshold value, wherein the collision detecting apparatus is intended to accurately perform a collision decision by preventing the occurrence of an erroneous detection based on a vibration waveform of acceleration of the vehicle due to, for example, riding past a stepped portion. &The collision detecting apparatus includes a vibration waveform detecting member W for detecting that an output waveform from the acceleration sensor S is a specific periodical vibration waveform, and a correcting member H for correcting the threshold value α on the basis of detection of the vibration waveform by the vibration waveform detecting means W so as to lower a detecting sensitivity of the collision detecting means C.

18 Claims, 4 Drawing Sheets

COLLISION DETECTING APPARATUS FOR VEHICLE

This nonprovisional application claims priority under 35 U.S.C. § 119(a) on Patent Application No. 2001-283694 filed in Japan on Sep. 18, 2001, which is herein incorporated by reference.

CROSS-REFERENCE TO RELATED APPLICATIONS

The present application claims priority under 35 USC 119 to Japanese Patent Application No. 2001-283694 filed on Sep. 18, 2001 the entire contents thereof is hereby incorporated by reference.

BACKGROUND OF THE INVENTION

1. Field of the Invention

The present invention relates to a collision detecting apparatus for a vehicle, which outputs a collision signal for starting a passenger protector for a vehicle, such as an air bag upon collision of the vehicle.

2. Description of Background Art

With respect to the collision detecting apparatus to which the present invention pertains, as described in Japanese Patent Laid-open No. Hei 4-176757, there is known a type including an integrating means for cumulatively integrating the output from an acceleration sensor when the output exceeds a specific calculation start level due to collision of the vehicle, wherein the collision detecting apparatus outputs a collision signal when a cumulative integral value calculated by the integrating means exceeds a specific threshold value.

The output from the acceleration sensor (detected acceleration) is rapidly changed upon collision of the vehicle. The output, however, may be sometimes periodically vary due a variety of causes other than collision during the operation of the vehicle. In this case, if the cumulative integral value of the output from the acceleration sensor exceeds the threshold value, a collision signal is uselessly outputted from the collision detecting means despite a collision of the vehicle, which requires the operation of a passenger protector, that does not occur.

For example, a motorcycle includes an acceleration sensor often mounted to a leading end portion of a front fork and its neighborhood as shown in FIG. 4 (see Japanese Patent Laid-open No. Hei 11-278342). When a front wheel rides past a stepped portion, a series of motions are applied to the leading end portion of the front fork. First, a large deceleration is applied thereto due to the contact between the front wheel and the stepped portion. Second, a large deceleration is applied thereto due to compression and bottoming of a suspension spring for the front wheel. Third, an excitation force in the vertical and longitudinal directions due to, for example, release of the compression of the suspension spring is applied thereto when the front wheel is moved upwardly. At last, a large deceleration is applied thereto when the front wheel is grounded. These series of motions cause, for example, a resonance of the front fork. As a result, the output waveform from the acceleration sensor sometimes becomes a periodical damped vibration waveform as shown in a graph of FIG. 4. The vibration waveform is characterized in that an amplitude of each of the second and later wave crests (2), (3) . . . becomes larger than that of the first wave crest (1).

According to the related art collision detecting apparatus, as the amplitude of the vibration waveform of the output from the acceleration sensor becomes large (particularly, in the order of the second and later wave crests), a cumulative integral value of the output from the acceleration sensor may sometimes exceed the threshold value. In this case, an erroneous collision decision may be made (that is, a collision signal is erroneously outputted) despite any collision of the vehicle that does not occur, to thereby uselessly start a passenger protector.

SUMMARY AND OBJECTS OF THE INVENTION

In view of the foregoing, the present invention has been made. It is an object of the present invention to provide a collision detecting apparatus for a vehicle, which is capable of preventing the occurrence of an erroneous detection due to a periodical vibration of acceleration due to a cause other than a collision of the vehicle, thereby accurately performing a collision decision.

To achieve the above object, according to the present invention, there is provided a collision detecting apparatus for a vehicle including an acceleration sensor for detecting an acceleration upon collision of the vehicle, integrating means for cumulatively integrating an output from the acceleration sensor when the output exceeds a specific calculation start level, and collision detecting means for outputting a collision signal when a cumulative integral value calculated by the integrating means exceeds a threshold value. The collision detecting apparatus includes vibration waveform detecting means for detecting that an output waveform from the acceleration sensor is a specific periodical vibration waveform, and correcting means for correcting the threshold value on the basis of detection of the vibration waveform by the vibration waveform detecting means so as to lower a detecting sensitivity of the collision detecting means.

With this configuration, upon collision of the vehicle, a collision signal is outputted from the collision detecting means when a cumulative integral value calculated by the integrating means exceeds a threshold value. Meanwhile, when an output waveform from the acceleration sensor becomes a specific periodical vibration waveform as a result of a cause other than collision, for example, riding past a stepped portion, the threshold value is corrected on the basis of detection of the vibration waveform by the vibration waveform detecting means so as to lower a detection sensitivity of the collision detecting means. As a result, a collision decision is more carefully made, to prevent the collision detecting means from outputting an unnecessary collision signal due to the vibration waveform. This is advantageous in that even if a relatively large vibration of acceleration occurs due to a cause other than a collision, the collision decision can be accurately performed with a high responsiveness, so that a starting time of a passenger protector can be optimally controlled on the basis of the collision decision.

According the present invention, when after the output from the acceleration sensor exceeds the calculation start level and then returns to the same level and the output exceeds the same level again within a specific time, the vibration waveform detecting means decides that the output waveform is a vibration waveform and outputs a detection signal. With this configuration, the generation of a vibration of acceleration as a result of, for example, riding past a stepped portion can be simply, accurately detected.

According to the present invention, when after the output from the acceleration sensor exceeds the calculation start level and then returns to the same level and the output does not exceed again the same level within the specific time, if the threshold value has already been corrected, the corrected threshold value is returned to the original threshold value. With this configuration, the convergence of the vibration of acceleration taken as a cause of correcting the threshold value or the dissipation of noise can be accurately detected. Since the threshold value is returned to the original value after the convergence of the vibration of acceleration or the dissipation of noise is detected, the operation can be rapidly returned to the usual collision monitoring operation after the cause of correcting the threshold is eliminated.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Hereinafter, one embodiment of the present invention will be described in detail with reference to the accompanying drawings.

Figure 1:
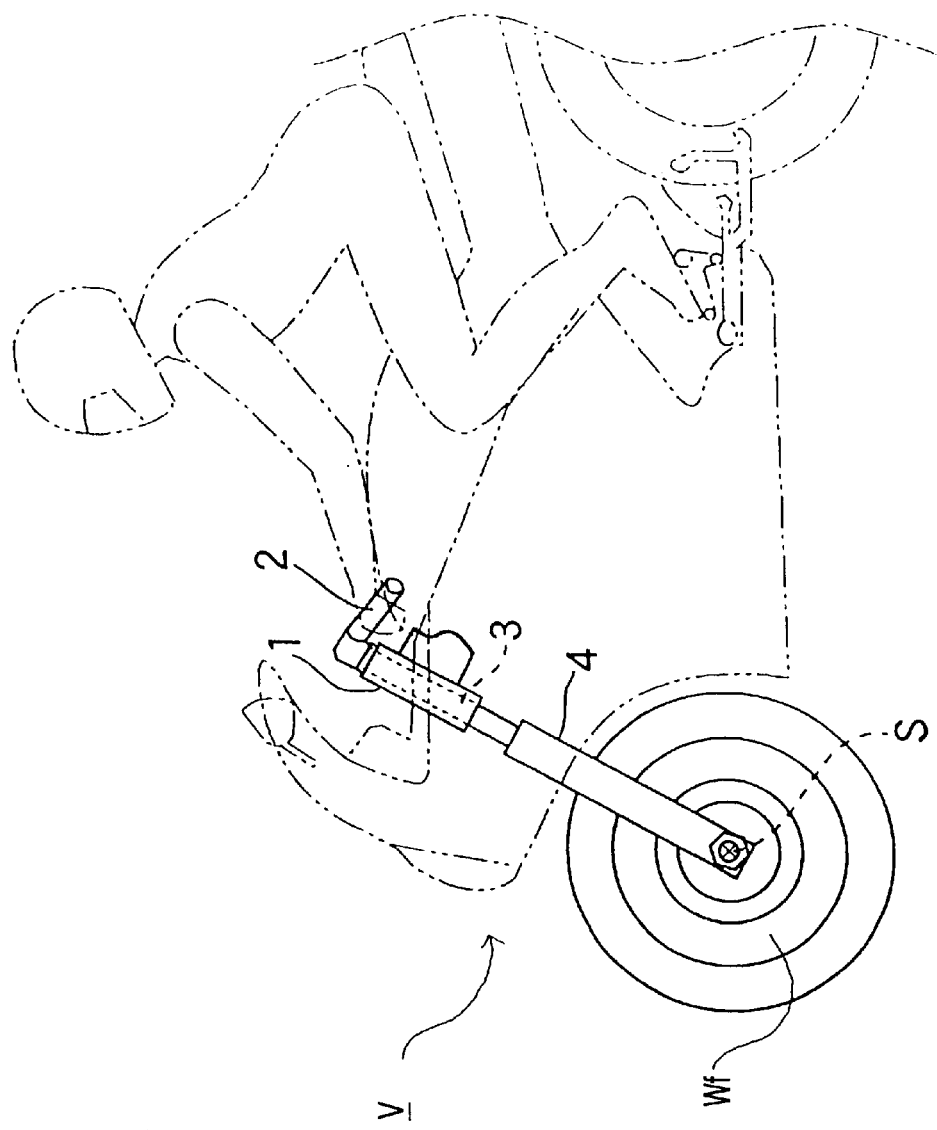
FIG. 1 is a schematic view showing the entire configuration of a motorcycle according to one embodiment of the present invention.

Referring first to FIG. 1, there is shown a motorcycle V representative of a vehicle to which the present invention is applied. A head pipe 1 is fixed to a front body of the motorcycle V, and a steering shaft 3 is turnably fitted to and supported by the head pipe 1. A steering handlebar 2 is connected to the upper end of the steering shaft 3, and a base end portion of a front fork 4 is fixed to the lower end of the steering shaft 3. A front wheel Wf is rotatably supported by a leading end portion of the front fork 4. An acceleration sensor S for detecting an acceleration applied to the vehicle when the motorcycle V collides is fixed to the leading end portion of the front fork 4 or in the vicinity thereof (front axle in the example shown in the figure). It is to be noted that the structure of mounting the sensor S to the front fork 4 is the same as a known structure described, for example, in Japanese Patent Laid-open No. Hei 11-278342, and the description thereof is omitted.

Figure 3:
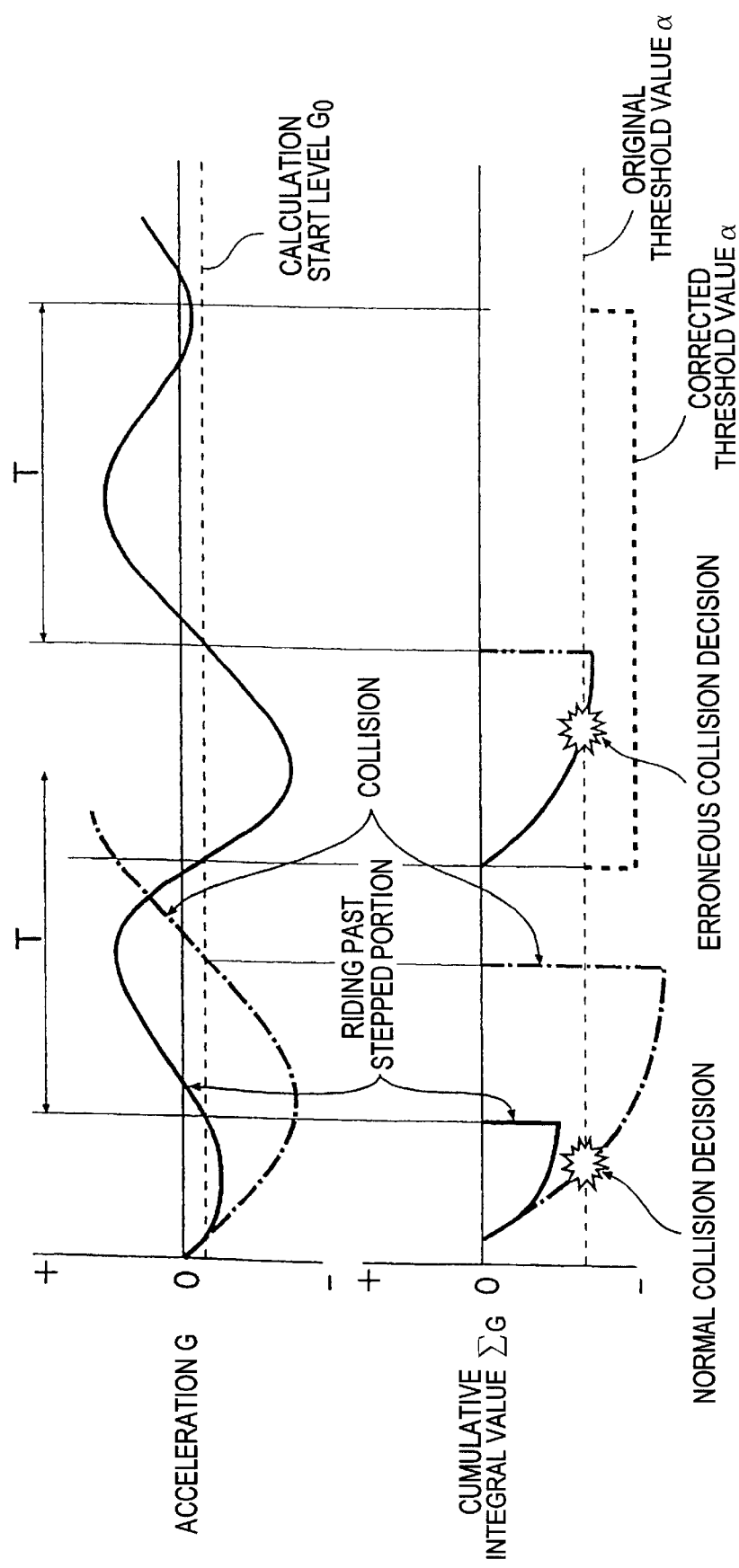
FIG. 3 is a timing chart showing a change state of each of an acceleration and a cumulative acceleration after collision.
Figure 4:
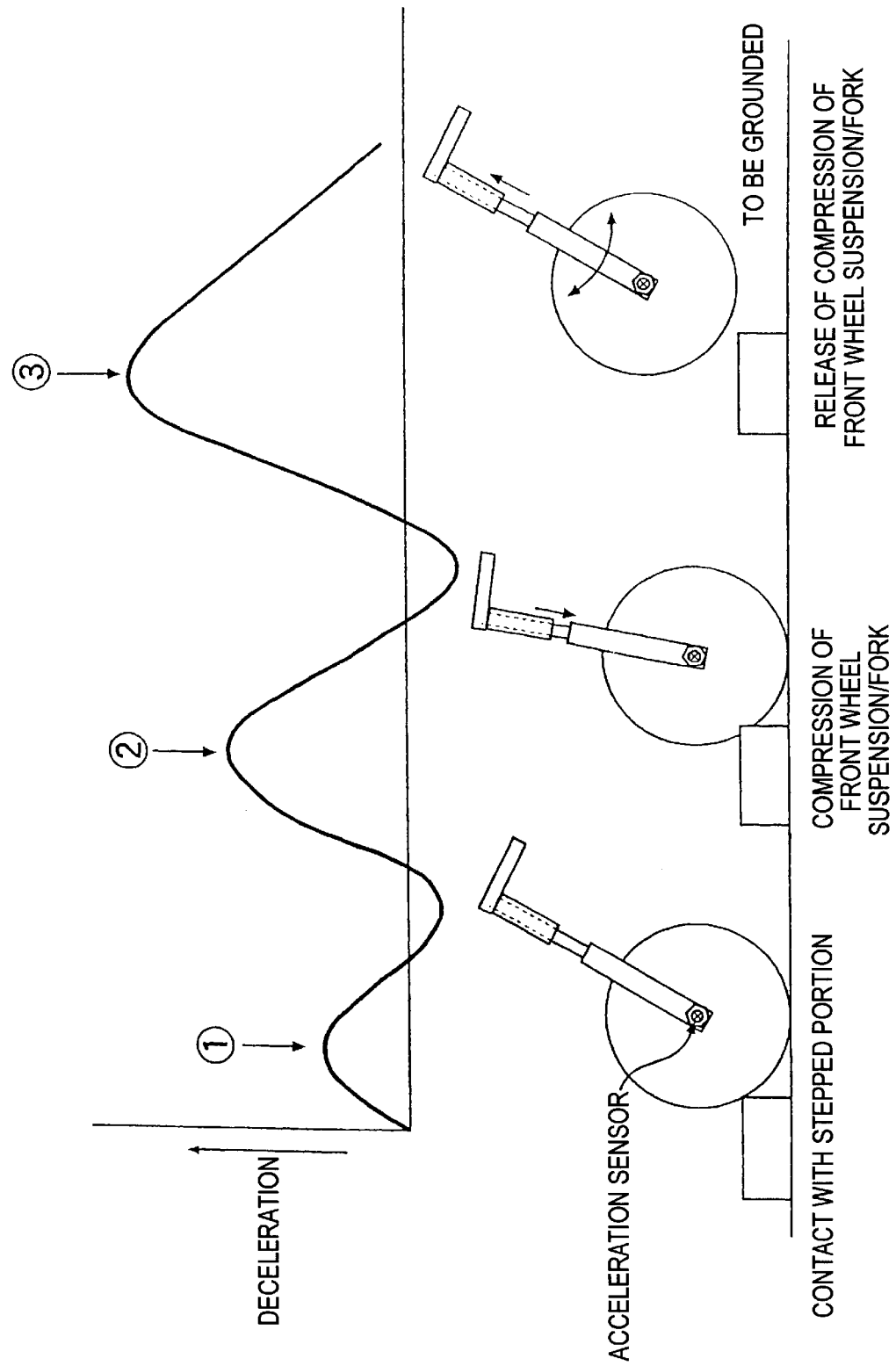
FIG. 4 is a diagram showing a vibration waveform of acceleration caused when the motorcycle rides past a stepped portion, and also illustrating the generation principle of the vibration waveform of the acceleration.

An output G (for example, an output voltage) of the acceleration sensor S corresponds to a value of an acceleration to be detected. A positive (+) value of the output G means a positive acceleration, and a negative (−) value of the output G means a negative acceleration (that is, a deceleration). Immediately after collision of the vehicle, as shown in FIG. 3, a negative output G indicating a deceleration outputted from the acceleration sensor S is changed so as to be raised on the negative side (lower than zero of the graph of FIG. 3).

Figure 2:
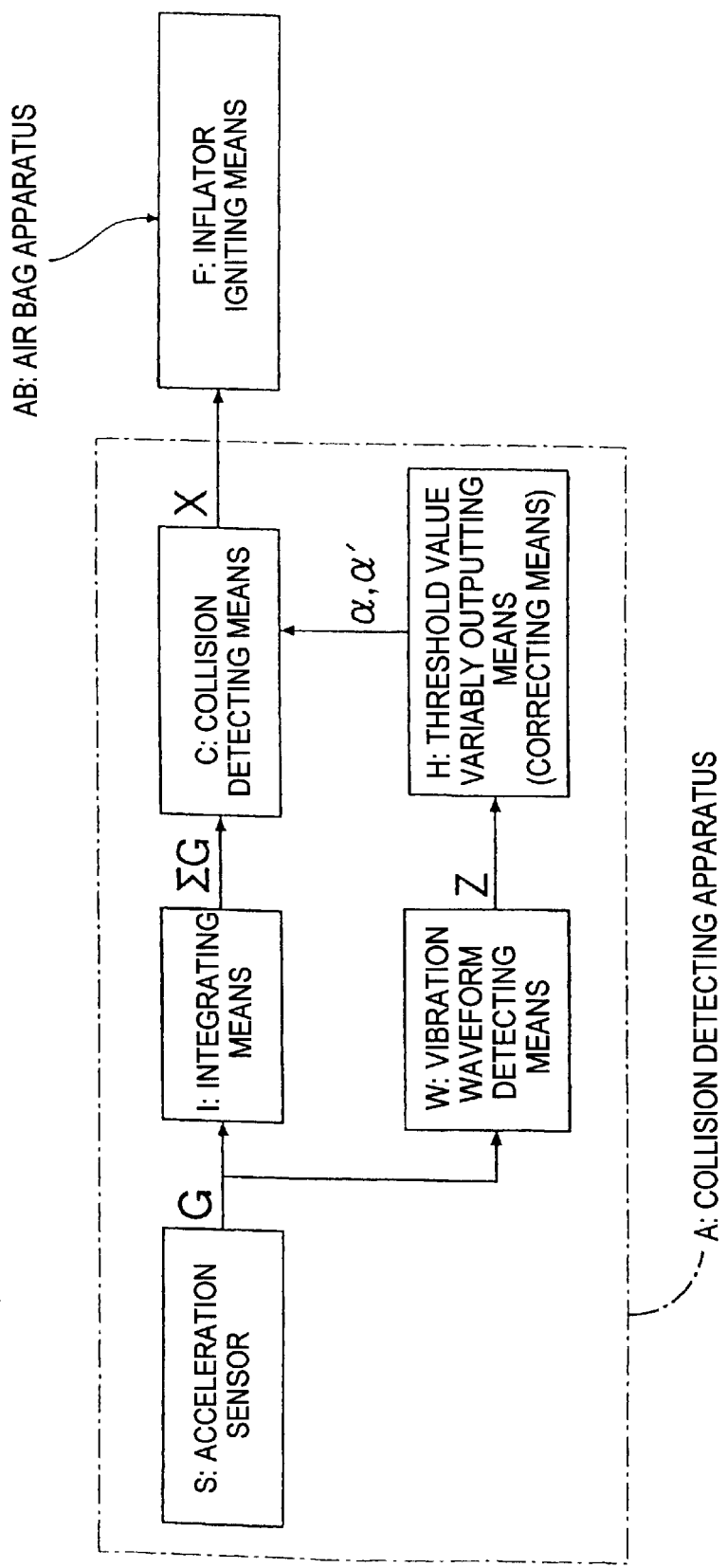
FIG. 2 is a control block diagram according to the present invention.

An air bag apparatus AB (FIG. 2) as a passenger protector is disposed at an appropriate position of the front body of the motorcycle V. Like a known air bag apparatus, the apparatus AB includes an inflator igniting means F, an inflator (not shown) ignited by starting the ignition means F, and an air bag (not shown) that is expanded by a gas blown from the inflator so as to protect a passenger. The inflator igniting means F starts in response to a collision signal X outputted from a collision detecting apparatus A (to be described later) upon collision of the vehicle, to ignite the inflator.

The collision detecting apparatus A includes the above-described acceleration sensor S, an integrating means I, a collision detecting means C. The integrating means I is adapted for cumulatively integrating the output G from the acceleration sensor S when the output G exceeds a specific calculation start level $G_0$. The collision detecting means C is adapted for outputting a collision signal when a cumulative integral value $\Sigma G$ calculated by the integrating means I exceeds a threshold value $\alpha$. In this embodiment, the collision detecting apparatus A further includes a vibration waveform detecting means W and a threshold value variably outputting means H as a correcting means. The vibration waveform detecting means W is adapted for detecting that an output waveform from the acceleration sensor S is a specific periodical vibration waveform as a result of, for example, riding past a stepped portion. The threshold value variably outputting means H is adapted for correcting the threshold value $\alpha$ on the basis of detection of the vibration waveform by the vibration detecting means W so as to lower a detection sensitivity of the collision detecting means C.

It is to be noted that most of the components, except the acceleration sensor S, of the collision detecting apparatus A can be controlled by an electronically-controlled unit such as a micro-computer provided at an appropriate position of the vehicular body.

As is apparent from FIG. 3, in a state immediately after a collision of the vehicle, since a negative acceleration, that is, a deceleration is applied to the vehicle, the output G from the acceleration sensor S is negative, so that the output differential value dG/dt and the cumulative integral value $\Sigma G$ become negative, and correspondingly, the calculation start level $G_0$ and the threshold value $\alpha$ are set to negative values.

When the output G from the acceleration sensor S exceeds the calculation start level $G_0$ on the negative side (lower than zero in the graph of FIG. 3) as a result of a collision of the vehicle, riding past a stepped portion, or the like and then returns to the same level $G_0$ the output G exceeds again the same level $G_0$ on the negative side (lower than zero in the graph of FIG. 3), the vibration waveform detecting means W decides that the output waveform is the vibration waveform generated due to a cause other than a collision (for example, riding past a stepped portion), and outputs a detection signal Z to the threshold value variably outputting means H as the correcting means.

When receiving the detection signal of the vibration waveform from the vibration waveform detecting means W, the threshold value variably outputting means H corrects the threshold value $\alpha$ so as to make a detecting sensitivity of the collision detecting means C lower than a usual value. To be more specific, the threshold value variably outputting means H stores the usual threshold value α corresponding to collision of the vehicle and a correction threshold value α' set on the side lowering the detecting sensitivity of the collision detecting means C (on the lower side in the graph of FIG. 3). Upon collision of the vehicle in which the vibration waveform detecting means W does not output any detection signal, the usual threshold value α is inputted in the collision detecting means C, and if the vibration waveform detecting means W detects the vibration waveform due to riding past of a stepped portion or the like, when receiving the detection signal from the vibration waveform detecting means W, the threshold value variably outputting means H selects the correction threshold value α' in place of the usual threshold value α and outputs the correction threshold value α' to the collision detecting means C.

When after the output G from the acceleration sensor S exceeds the calculation start level $G_0$ on the negative side (lower than zero in the graph of FIG. 3) and then returns to the same level $G_0$, the output G does not exceeds again the same level $G_0$ within the specific time T on the negative side (lower than zero in the graph of FIG. 3), if the threshold value α has been-already corrected, the corrected value is returned to the original threshold value α.

The function of this embodiment will be described below. Upon collision of the vehicle, the acceleration sensor S is operated. When the output G from the acceleration sensor S exceeds the specific calculation start level $G_0$, the integrating means I starts the cumulative integration of the output G. When the cumulative integral value ΣG calculated by the integrating means I exceeds the usual threshold value α on the negative side (lower than zero in the graph of FIG. 3), the collision detecting means C outputs the collision signal X to the inflator igniting means F. As a result, the inflator starts to rapidly generate a gas to abruptly expand the air bag, thereby protecting a passenger from the impact caused by the collision of the vehicle. If after the integrating means I starts the cumulative integration, the output G from the acceleration sensor S returns to a specific calculation end level $G_0$ (which is set to the same level as the calculation start level $G_0$ in the example shown in the figure, but may be set to a level different therefrom), the integrating means I resets the cumulative integral value ΣG, and stops the cumulative integration.

During operation of the vehicle, if the output waveform from the acceleration sensor S becomes the specific periodical vibration waveform as a result of a cause other than collision, for example, riding past a stepped portion, the threshold value α is corrected on the basis of the detection signal of the vibration waveform outputted from the vibration waveform detecting means W to the threshold value variably outputting means H so as to lower the detection sensitivity of the collision detecting means C (that is, changed into the correction threshold value α'). Accordingly, a collision decision is carefully made, to prevent the collision detecting means from outputting an unnecessary collision signal X due to the vibration waveform. As a result, even if a relatively large vibration of acceleration occurs due to a cause other than collision, the collision decision can be accurately performed with a high responsiveness, so that the starting time of the air bag apparatus AB can be optimally controlled.

According to this embodiment, when after the output G from the acceleration sensor S exceeds the calculation start level $G_0$ and then returns to the same level $G_0$, the output G exceeds again the same level $G_0$ within the specific time T, the vibration waveform detecting means W decides that the output waveform is the vibration waveform and outputs the detection signal Z. As a result, the generation of the vibration of acceleration due to, for example, riding past a stepped portion can be simply, accurately detected while being distinguished from that due to a usual collision.

When after the output G from the acceleration sensor S exceeds the calculation start level $G_0$ and then returns to the same level $G_0$ and the output G does not exceed again the same level $G_0$ (that is, the convergence of the vibration of acceleration taken as the cause of correcting the threshold value α or the dissipation of noise is detected) within the specific time T, if the threshold value α has been already corrected, the threshold value variably outputting means H as the correcting means returns the corrected threshold value to the original value. Accordingly, the operation of the collision detecting apparatus A can be rapidly returned to the usual collision monitoring operation.

While the embodiment of the present invention has been described in detail, the present invention is not limited thereto, and it is to be understood that various changes in design may be made without departing from the scope of the present invention.

In the embodiment, the vehicle to which the present invention is applied is configured as a motorcycle liable to cause a rigid collision; however, since even a four-wheeled vehicle may possibly cause a rigid collision depending on an operating state of the vehicle, the present invention is applicable to a four-wheeled vehicle.

As described above, according to the present invention, when an output waveform from the acceleration sensor becomes a specific periodical vibration waveform as a result of a cause other than a collision, for example, riding past a stepped portion, the threshold value is corrected on the basis of a detection of the vibration waveform by the vibration waveform detecting means so as to lower a detection sensitivity of the collision detecting means. As a result, collision decision is more carefully made, to prevent the collision detecting means from outputting an unnecessary collision signal due to a vibration waveform. This is advantageous in that even if a relatively large vibration of acceleration occurs as a result of riding past a stepped portion or the like, the collision decision can be accurately performed, so that the starting time of a passenger protector can be optimally controlled.

According to the present invention, the generation of a vibration of acceleration as a result of, for example, riding past a stepped portion can be simply, accurately detected.

According to the present invention, the convergence of the vibration of acceleration taken as a cause of correcting the threshold value can be accurately detected, and since the threshold value is returned to the original value after the convergence of the vibration of acceleration is detected, the operation can be rapidly returned to the usual collision monitoring operation after the cause of correcting the threshold is eliminated.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A collision detecting apparatus for a vehicle comprising:

an acceleration sensor (S) for detecting an acceleration upon collision of said vehicle;

integrating means (I) for cumulatively integrating an output (G) from said acceleration sensor (S) when the output (G) exceeds a specific calculation start level ($G_O$); and collision detecting means (C) for outputting a collision signal (X) when a cumulative integral value (ΣG) calculated by said integrating means (I) exceeds a threshold value (α);

vibration waveform detecting means (W) for detecting that an output waveform from said acceleration sensor (S) is a specific periodical vibration waveform; and correcting means (H) for correcting the threshold value (α) on the basis of detection of the vibration waveform by said vibration waveform detecting means (W) so as to lower a detecting sensitivity of said collision detecting means (C).

2. The collision detecting apparatus for a vehicle according to claim 1, wherein if the detecting means W detects a vibration waveform due to riding on a stepped portion when receiving a detection signal from the vibration waveform detecting means W, the correcting means H selects the corrected threshold value α' in place of the usual threshold α and outputs the correction threshold value α' to the collision detecting means C.

3. The collision detecting apparatus for a vehicle according to claim 1, wherein when the output (G) from said acceleration sensor (S) exceeds the calculation start level ($G_O$) and then returns to a predetermined level distinct from the start level ($G_O$) within a specific time ($T_O$), the cumulative integration is stopped.

4. A collision detecting apparatus for a vehicle comprising:

an acceleration sensor (S) for detecting an acceleration upon collision of said vehicle;

integrating means (I) for cumulatively integrating an output (G) from said acceleration sensor (S) when the output (G) exceeds a specific calculation start level ($G_O$); and collision detecting means (C) for outputting a collision signal (X) when a cumulative integral value (ΣG) calculated by said integrating means (I) exceeds a threshold value (α);

vibration waveform detecting means (W) for detecting that an output waveform from said acceleration sensor (S) is a specific periodical vibration waveform; and correcting means (H) for correcting the threshold value (α) on the basis of detection of the vibration waveform by said vibration waveform detecting means (W) so as to lower a detecting sensitivity of said collision detecting means (C), wherein when after the output (G) from said acceleration sensor (S) exceeds the calculation start level ($G_O$) and then returns to the same level ($G_O$), the output exceeds the same level ($G_O$) again within a specific time (T), said vibration waveform detecting means (W) decides that the output waveform is the vibration waveform and outputs a detection signal (Z).

5. The collision detecting apparatus for a vehicle according to claim 4, wherein when after the output from said acceleration sensor (S) exceeds the calculation start level ($G_O$) and then returns to the same level ($G_O$) and the output (G) does not exceed again the same level ($G_O$) within the specific time (T), if the threshold value (α) has already been corrected, the corrected threshold value (α) is returned to the original threshold value (α).

6. The collision detecting apparatus for a vehicle according to claim 4, wherein when the output (G) from said acceleration sensor (S) exceeds the calculation start level ($G_O$) and then returns to a predetermined level distinct from the start level ($G_O$) within a specific time ($T_O$), the cumulative integration is stopped.

7. A collision detecting apparatus for a vehicle comprising:

an acceleration sensor (S) for detecting an acceleration upon collision of said vehicle;

integrating means (I) for cumulatively integrating an output (G) from said acceleration sensor (S) when the output (G) exceeds a specific calculation start level ($G_O$); and collision detecting means (C) for outputting a collision signal (X) when a cumulative integral value (ΣG) calculated by said integrating means (I) exceeds a threshold value (α);

vibration waveform detecting means (W) for detecting that an output waveform from said acceleration sensor (S) is a specific periodical vibration waveform; and correcting means (H) for correcting the threshold value (α) on the basis of detection of the vibration waveform by said vibration waveform detecting means (W) for changing a detecting sensitivity of said collision detecting means (C) to be lower than a predetermined value.

8. The collision detecting apparatus for a vehicle according to claim 7, wherein if the detecting means W detects a vibration waveform due to riding on a stepped portion when receiving a detection signal from the vibration waveform detecting means W, the correcting means H selects the corrected threshold value α' in place of the usual threshold α and outputs the correction threshold value α' to the collision detecting means C.

9. The collision detecting apparatus for a vehicle according to claim 7, wherein when the output (G) from said acceleration sensor (S) exceeds the calculation start level ($G_O$) and then returns to a predetermined level distinct from the start level ($G_O$) within a specific time ($T_O$), the cumulative integration is stopped.

10. A collision detecting apparatus for a vehicle comprising:

an acceleration sensor (S) for detecting an acceleration upon collision of said vehicle;

integrating means (I) for cumulatively integrating an output (G) from said acceleration sensor (S) when the output (G) exceeds a specific calculation start level ($G_O$); and collision detecting means (C) for outputting a collision signal (X) when a cumulative integral value (ΣG) calculated by said integrating means (I) exceeds a threshold value (α);

vibration waveform detecting means (W) for detecting that an output waveform from said acceleration sensor (S) is a specific periodical vibration waveform; and correcting means (H) for correcting the threshold value (α) on the basis of detection of the vibration waveform by said vibration waveform detecting means (W) for changing a detecting sensitivity of said collision detecting means (C) to be lower than a predetermined value, wherein when after the output (G) from said acceleration sensor (S) exceeds the calculation start level ($G_O$) and then returns to the same level ($G_O$), the output exceeds the same level ($G_O$) again within a specific time (T), said vibration waveform detecting means (W) decides that the output waveform is the vibration waveform and outputs a detection signal (Z).

11. The collision detecting apparatus for a vehicle according to claim 10, wherein when after the output from said acceleration sensor (S) exceeds the calculation start level ($G_0$) and then returns to the same level ($G_0$) and the output (G) does not exceed again the same level ($G_0$) within the specific time (T), if the threshold value ($\alpha$) has already been corrected, the corrected threshold value ($\alpha'$) is returned to the original threshold value ($\alpha$).

12. The collision detecting apparatus for a vehicle according to claim 10, wherein when the output (G) from said acceleration sensor (S) exceeds the calculation start level ($G_0$) and then returns to a predetermined level distinct from the start level ($G_0$) within a specific time ($T_0$), the cumulative integration is stopped.

13. A method of determining a collision of a vehicle comprising the following steps:

detecting an acceleration upon collision of said vehicle;

cumulatively integrating an output (G) from an acceleration sensor (S) when the output (G) exceeds a specific calculation start level ($G_0$);

outputting a collision signal (X) when a cumulative integral value ($\Sigma G$) calculated by an integrating means (I) exceeds a threshold value ($\alpha$);

detecting that an output waveform from said acceleration sensor (S) is a specific periodical vibration waveform; and correcting the threshold value ($\alpha$) on the basis of detection of the vibration waveform by said vibration waveform detecting means (W) so as to lower a detecting sensitivity of said collision detecting means (C).

14. The method of determining a collision of a vehicle according to claim 13, wherein if the detecting means W detects a vibration waveform due to riding on a stepped portion when receiving a detection signal from the vibration waveform detecting means W, the correcting means H selects the corrected threshold value $\alpha'$ in place of the usual threshold $\alpha$ and outputs the correction threshold value $\alpha'$ to the collision detecting means C.

15. The method of determining a collision of a vehicle according to claim 13, wherein when the output (G) from said acceleration sensor (S) exceeds the calculation start level ($G_0$) and then returns to a predetermined level distinct from the start level ($G_0$) within a specific time ($T_0$), the cumulative integration is stopped.

16. A method of determining a collision of a vehicle comprising the following steps:

detecting an acceleration upon collision of said vehicle;

cumulatively integrating an output (G) from an acceleration sensor (S) when the output (G) exceeds a specific calculation start level ($G_0$);

outputting a collision signal (X) when a cumulative integral value ($\Sigma G$) calculated by an integrating means (I) exceeds a threshold value ($\alpha$);

detecting that an output waveform from said acceleration sensor (S) is a specific periodical vibration waveform; and correcting the threshold value ($\alpha$) on the basis of detection of the vibration waveform by said vibration waveform detecting means (W) so as to lower a detecting sensitivity of said collision detecting means (C), wherein when after the output (G) from said acceleration sensor (S) exceeds the calculation start level ($G_0$) and then returns the same level ($G_0$), the output exceeds the same level ($G_0$) again within a specific time (T), the detecting means (W) decides that the output waveform is the vibration waveform and outputs a detection signal (Z).

17. The method of determining a collision of a vehicle according to claim 16, wherein when after the output from said acceleration sensor (S) exceeds the calculation start level ($G_0$) and then returns to the same level ($G_0$) and the output (G) does not exceed again the same level ($G_0$) within the specific time (T), if the threshold value ($\alpha$) has already been corrected, the corrected threshold value ($\alpha'$) is returned to the original threshold value ($\alpha$).

18. The method of determining a collision of a vehicle according to claim 16, wherein when the output (G) from said acceleration sensor (S) exceeds the calculation start level ($G_0$) and then returns to a predetermined level distinct from the start level ($G_0$) within a specific time ($T_0$), the cumulative integration is stopped.

* * * * *